US008972582B2

(12) United States Patent
Haverinen et al.

(10) Patent No.: US 8,972,582 B2
(45) Date of Patent: Mar. 3, 2015

(54) METHOD AND APPARATUS ENABLING REAUTHENTICATION IN A CELLULAR COMMUNICATION SYSTEM

(75) Inventors: Henry Haverinen, Pouppola (FI); Kalle Ahmavaara, Helsinki (FI)

(73) Assignee: Nokia Corporation, Espoo (FI)

( * ) Notice: Subject to any disclaimer, the term of this patent is extended or adjusted under 35 U.S.C. 154(b) by 2110 days.

(21) Appl. No.: 10/659,774

(22) Filed: Sep. 10, 2003

(65) Prior Publication Data

US 2004/0153555 A1 Aug. 5, 2004

Related U.S. Application Data

(60) Provisional application No. 60/416,481, filed on Oct. 3, 2002.

(51) Int. Cl.
*G06F 15/16* (2006.01)
*H04L 29/06* (2006.01)
(Continued)

(52) U.S. Cl.
CPC ............. *H04L 63/08* (2013.01); *H04L 61/301* (2013.01); *H04L 63/0892* (2013.01); *H04W 12/06* (2013.01); *H04L 29/12594* (2013.01);
(Continued)

(58) Field of Classification Search
USPC .................................. 709/227, 229; 455/433
See application file for complete search history.

(56) References Cited

U.S. PATENT DOCUMENTS 5,349,643 A * 9/1994 Cox et al. ...................... 713/155

5,544,322 A 8/1996 Cheng et al.
(Continued)

FOREIGN PATENT DOCUMENTS

JP 11-041252 2/1999
JP 2002-198955 7/2002
(Continued)

OTHER PUBLICATIONS

Shaefer, G. et al., "Current Approaches to Authentication in Wireless and Mobile Communications Networks"; Technical Report TKN-01-002, Mar. 26, 2001 Online at www.gallileus.info/gallileus/members/m_HolgerKarl/publications/100859230709/100859303169; p. 3-6, p. 39-45.

(Continued)

*Primary Examiner* — Thomas Dailey
(74) *Attorney, Agent, or Firm* — Mintz Levin Cohn Ferris Glovsky and Popeo, P.C.

(57) ABSTRACT

A method (and corresponding equipment) for use in reauthentication—after a first, full authentication by a first authentication server (23a)—of a communication session involving the exchange of information between a terminal (21) and a server (24), the method including: a step (11) in which the first authentication server (23a) and other authentication servers (23b) are each assigned a respective unique realm name; and a step (13) in which during authentication between the terminal and the first authentication server (23a), the first authentication server (23a) transmits to the terminal (21) a reauthentication identity including the unique realm name assigned to the first authentication server. Then, later, during reauthentication, to make possible that the reauthentication is performed by the same authentication server (23a) as performed the full authentication—i.e. by the first authentication server (23a)—the reauthentication identity is included in a request for reauthentication.

15 Claims, 2 Drawing Sheets

(51) Int. Cl.
*H04L 29/12* (2006.01)
*H04W 12/06* (2009.01)
*H04W 8/26* (2009.01)
*H04W 84/04* (2009.01)

(52) U.S. Cl.
CPC ......... *H04L61/3045* (2013.01); *H04L 63/0853* (2013.01); *H04L 63/162* (2013.01); *H04W 8/26* (2013.01); *H04W 84/042* (2013.01)
USPC ............................ 709/227; 709/229; 455/433

(56) References Cited

U.S. PATENT DOCUMENTS

| | | | |
|---|---|---|---|
| 5,708,780 A * | 1/1998 | Levergood et al. | 709/229 |
| 5,740,361 A | 4/1998 | Brown | |
| 5,887,251 A | 3/1999 | Fehnel | 455/411 |
| 5,928,363 A | 7/1999 | Ruvolo | |
| 6,088,451 A * | 7/2000 | He et al. | 726/8 |
| 6,263,432 B1 * | 7/2001 | Sasmazel et al. | 713/100 |
| 6,651,105 B1 * | 11/2003 | Bhagwat et al. | 709/239 |
| 6,662,228 B1 | 12/2003 | Limsico | |
| 7,007,093 B2 * | 2/2006 | Spicer et al. | 709/229 |
| 2002/0133719 A1 * | 9/2002 | Westerdal | 713/201 |
| 2003/0163733 A1 * | 8/2003 | Barriga-Caceres et al. | 713/201 |
| 2003/0176188 A1 * | 9/2003 | O'Neill | 455/433 |
| 2004/0085942 A1 | 5/2004 | Le et al. | |

FOREIGN PATENT DOCUMENTS

| | | |
|---|---|---|
| JP | 2002-207649 | 7/2002 |
| JP | 2002-207733 | 7/2002 |
| RU | 2190310 | 9/2002 |

OTHER PUBLICATIONS

EAP AKA Authentication; J. Arkko; Feb. 2002; published on the Internet.
EAP AKA Authentication; J. Arkko; Jun. 2002; published on the Internet.
EAP SIM Authentication; H. Haverinen; Feb. 2002; published on the Internet.
EAP SIM Authentication; H. Haverinen; Jun. 2002; published on the Internet.
3rd Generation Partnership Project; Technical Specification Group Services and System Aspects; 3G Security; Security Architecture (Release 5); 3GPP TS 33.102; V5.0.0 (Jun. 2002); Jun. 2003.
Digital cellular telecommunications system (Phase 2); Security related network functions (GSM 03.20 version 4.4.1); European Telecomniunication Standard; ETS 300 534; Aug. 1997.
RFC 2284—PPP Extensible Authentication Protocol (EAP); L. Blunk; Mar. 1998.
G. Schäfer et al., Current Approaches to Authentication in Wireless and Mobile Communications Networks, TKN Technical Report Series (TKN-01-002) Version 1.0, p. 1-54 (Mar. 26, 2001).
Russian Patent Office; Decision on Grant; Apr. 26, 2009; pp. 1-8. English translation provided.
Network Working Group; B. Aboba et al.; "The Network Access Identifier"; pp. 1-8; Jan. 1999.
Japanese Patent Office; S. Kuwabara; "Notice of Reasons for Rejection"; whole document; Apr. 2, 2010; and English translation.

* cited by examiner

METHOD AND APPARATUS ENABLING REAUTHENTICATION IN A CELLULAR COMMUNICATION SYSTEM

CROSS REFERENCE TO RELATED APPLICATION

Reference is made to and priority claimed from U.S. provisional application Ser. No. 60/416,481, filed Oct. 3, 2002, entitled EAP AKA AND SIM AUTHENTICATION.

TECHNICAL FIELD

The present invention pertains to an Extensible Authentication Protocol (EAP) mechanism for authentication and session key distribution in a communication system, such as the EAP mechanism for Authentication and (session) Key (distribution) Agreement (AKA) of Universal Mobile Telecommunications System (UMTS), and also such as the EAP mechanism for AKA as implemented in the Subscriber Identity Module (SIM) used in the Global System for Mobile communications (GSM). More particularly, the present invention pertains to reauthentication in communication systems that use EAP mechanisms for GSM SIM or UMTS AKA authentication.

BACKGROUND ART

AKA is based on challenge-response mechanisms and symmetric cryptography and in UMTS is as set out in 3GPP (Third Generation Partnership Program) TS (Technical Specification) 33.102 V3.6.0: "Technical Specification Group Services and System Aspects; 3G Security; Security Architecture (Release 1999)," 3rd Generation Partnership Project, November 2000. AKA typically runs in a UMTS Subscriber Identity Module (USIM), a smart card-like device. However, the applicability of AKA is not limited to client devices with smart cards; e.g. AKA mechanisms can also be implemented in host software. AKA also provides backward compatibility to the GSM authentication mechanism set out in GSM 03.20 (ETS 300 534): "Digital cellular telecommunication system (Phase 2); Security related network functions," European Telecommunications Standards, Institute, August 1997. Compared to the GSM mechanism, AKA provides substantially longer key lengths and also authentication of the server side (as well as the client side)

In order for a client device, such as a wireless terminal (more specifically such as a mobile station), to use the services provided by a server, such as a server in a communication system provided and managed by an operator (or indeed the services of a server of any kind of network, including e.g. the Internet), the terminal or the user must in some cases (for some networks and for some services of those networks) authenticate itself to the server and vice versa (the latter at least in some networks, notably UMTS), i.e. each must prove to the other it is who it claims to be. On dial-up networks, wireless LANs, wired LAN networks, and various Digital Subscriber Line (XDSL) networks, the operator of the network typically uses what is often called an AAA (Authentication, Authorization and Accounting) server to authenticate a client, and to authenticate the server of the operator network to which the client has directed a request for services (or to authenticate the operator network irrespective of any particular server). An AAA server may be responsible for storing shared secrets and other credential information necessary for the authentication of users (terminals with components specific to a particular user and so identifying the user), or an AAA server may use a separate user database server for storing the credential information. The Extensible Authentication Protocol (EAP) is often used on networks that employ AAA servers for authentication between an AAA server and a terminal. If the operator of the network is a cellular operator of a UMTS or GSM networks, the EAP method may encapsulate enhanced GSM authentication and key agreement, as in EAP SIM, or enhanced UMTS authentication and key agreement, as in EAP AKA. The terminal exchanges authentication packets with an attendant device on the local network. The attendant device is different on different types of networks, but it may be for example a wireless LAN access point, an Ethernet switch or a dial-up Network Access Server (NAS). The attendant device usually operates as what is called an AAA client, and the AAA client and the AAA server carry out the authentication using what is called an AAA protocol.

In the beginning of a communication session that is established with EAP SIM or EAP AKA, the terminal and the AAA server carry out what is here called full authentication, i.e. authentication starting from a state in which neither the terminal nor the AAA server has any basis for authenticating the other.

After full authentication is established, it may be that after some predetermined time or in the event of some other condition being met, reauthentication is required to reduce the chance that a "bad guy" has either begun masquerading as the originally authenticated entity using some other device (a server device or a client device), or has even somehow gained physical control of the originally authenticated device (e.g. a user left an authenticated terminal on and walked away) and has begun sending requests. A reauthentication may also be required in order to ascertain that the terminal is still using the network resources, as claimed by accounting messages sent by the local network. Also, a reauthentication may be used in order to negotiate new security keys in cases where the lifetime of the keys is limited due to security reasons. Reauthentication is identical in EAP SIM (for GSM) and EAP AKA (for UMTS).

The prior art of EAP SIM and EAP AKA protocols provides for reauthentication, making use of separate reauthentication user identities delivered from the AAA server to the terminal being reauthenticated. Reauthentication is based on session keys and other context information established during full authentication.

An operator may deploy in a network several AAA servers for load balancing and other reasons. Because an AAA server can be selected at random for authenticating a terminal, or can be selected by some predetermined mechanism such as a round-robin mechanism, a terminal (user) may not always authenticate with the same AAA server. In such a network, reauthentication becomes a problem in that the context information is only stored in the AAA server that performed the full authentication. Since reauthentication assumes the availability of some information provided during full authentication, it will not work (i.e. it cannot be performed) if a terminal's AAA request for reauthentication is relayed to a different AAA server than the AAA server that performed the full authentication.

Thus, what is needed is a way for reauthentication to work in networks where a request for reauthentication might be relayed to an AAA server other than the AAA server that performed the full authentication.

DISCLOSURE OF THE INVENTION

Accordingly, in a first aspect of the invention, a method is provided for use in reauthentication of a communication session involving the exchange of information between a terminal and a server via an authentication network, the communication session having already been authenticated by the terminal and a first authentication server of the authentication network, the method characterized by: a step in which the first authentication server and other authentication servers are each assigned a respective unique realm name; and a step in which during authentication between the terminal and the first authentication server, the first authentication server transmits to the terminal a reauthentication identity including the unique realm name assigned to the first authentication server.

In accord with the first aspect of the invention, the method may be further characterized by: a step in which to perform a reauthentication the terminal transmits a request for reauthentication using the reauthentication identity including the unique realm name; and a step in which an authentication network element receiving the request for reauthentication determines from the reauthentication identity included in the request the unique realm name indicating the authentication server that performed the full authentication. The method may be even further characterized by: a step in which an authentication network element forwards the request to the authentication server indicated by the unique realm name included as part of the reauthentication identity; and a step in which the terminal and the first authentication server perform reauthentication.

In a second aspect of the invention, an authentication server in a cellular communication system is provided, comprising means for reauthentication of a communication session between a terminal and a content server, the authentication server characterized by: means for receiving an assigned a unique realm name; and means for transmitting to the terminal a reauthentication identity including the unique realm name.

In accord with the first aspect of the invention, the authentication server may be further characterized by: means for receiving a request for reauthentication using the reauthentication identity and for determining from the reauthentication identity the unique realm name. The authentication server may be even further characterized by: mecans for forwarding the request to the authentication server indicated by the unique realm name included as part of the reauthentication identity.

In a third aspect of the invention, a computer program product is provided comprising: a computer readable storage structure embodying computer program code thereon for execution by a computer processor in an authentication server, with said computer program code characterized in that it includes instructions for enabling the means of an apparatus according to the second aspect of the invention.

In a fourth aspect of the invention, a system is provided, including a plurality of terminals, a plurality of authentication servers, and at least one content server, the terminals operative so as to request content from the content server after authentication and occasional reauthentication with one or another of the authentication servers, the system characterized in that at least two of the authentication servers are each an apparatus according to the second aspect of the invention.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

This invention provides a solution to the problem of how to ensure that reauthentication works in networks where a request for reauthentication might be relayed to an AAA server other than the AAA server that performed the full authentication. To solve the problem, the invention makes it possible to select as the AAA server on reauthentication, the AAA server that performed the full authentication.

The invention is described below in connection with the Extensible Authentication Protocol (EAP) mechanism for authentication and session key distribution in Universal Mobile Telecommunications System (UMTS) Authentication and Key Agreement (AKA), as set out in 3GPP TS 33.102 V3.6.0: "Technical Specification Group Services and System Aspects; 3G Security; Security Architecture (Release 1999)", 3rd Generation Partnership Project, November 2000, and in the IETF (Internet Engineering Task Force) draft document, "EAP AKA Authentication," draft-arkko-pppext-eap-aka-04.txt, by J. Arkko and H. Haverinen, June 2002. The UMTS is a global third generation mobile network standard. The invention is also obviously of use in connection with the EAP mechanism for authentication and session key distribution using the Global System for Mobile communications (GSM) Subscriber Identity Module (SIM), as set out in GSM Technical Specification GSM 03.20 (ETS 300 534): "Digital cellular telecommunication system (Phase 2); Security related network functions", European Telecommunications Standards, Institute, August 1997, and in the IETF draft document, "EAP SIM Authentication," by H. Haverinen, draft-haverinen-pppext-eap-sim-05.txt, 2 Jul. 2002. Although the invention is described in particular for use with the Extensible Authentication Protocol and its methods for UMTS and GSM, it should be understood that nothing about the invention restricts it to use in Extensible Authentication Protocol or cellular communication systems according to UMTS or GSM standards; the invention is in fact of use in any communication system providing for authentication in a way similar to or comparable to the use of Extensible Authentication Protocol in conjunction with AAA protocols. The invention in case of the described embodiment makes use of the so-called EAP (Extensible Authentication Protocol), as set out in RFC 2284, entitled, "PPP Extensible Authentication Protocol (EAP)," published by the Network Working Group of the IETF. The (PPP) EAP is a general protocol for authentication; it supports multiple authentication mechanisms.

Figure 1:
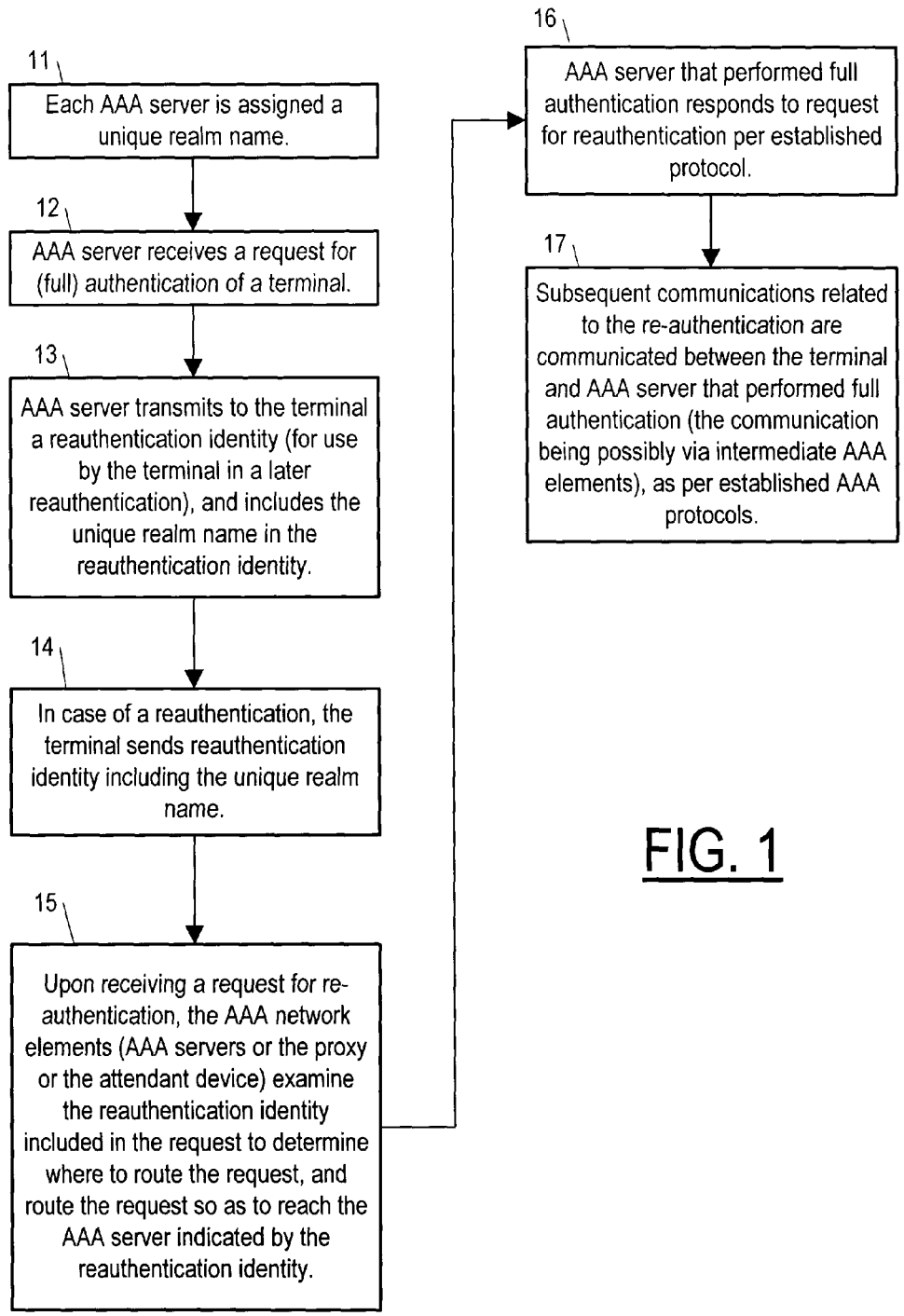
FIG. 1 is a flow chart of a method for reauthentication of a terminal (with an authentication server acting as an authentication agent), according to the invention.
Figure 2:
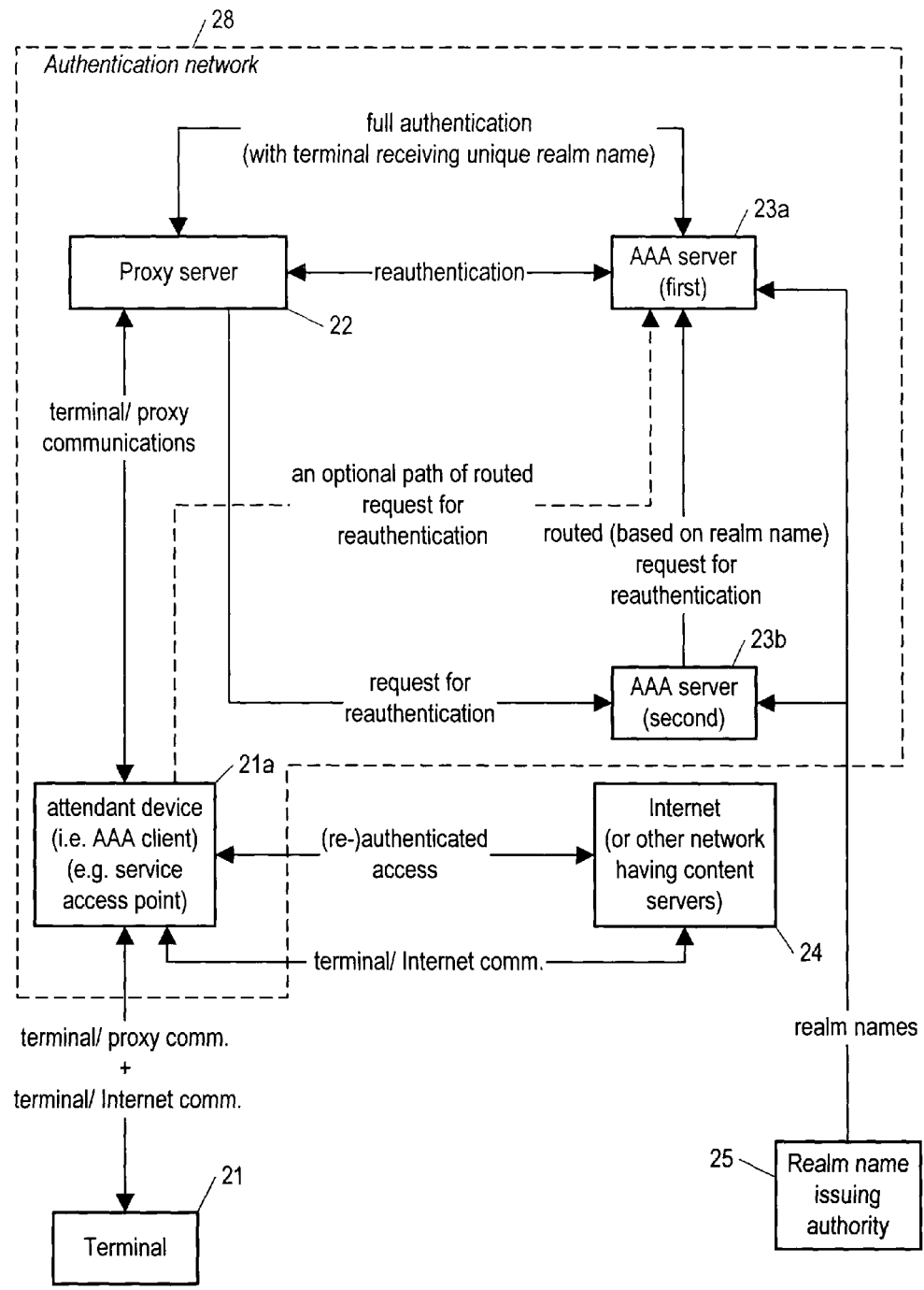
FIG. 2 is a block diagram/flow diagram of a terminal authenticating and then reauthenticating with an authentication server, according to the invention.

Referring now to FIGS. 1 and 2, to ensure that reauthentication is always possible, the invention provides a method including a first step 11 in which each AAA server 23a 23b (in the same or different operator networks) is assigned a unique realm name, and in case of UMTS or GSM and authentication for IP services, it is a name of a type that can be used in (as part of, i.e. as e.g. in user realm in which "realm" is the unique realm name) a Network Access Identifier (NAI), which is the identifier (of a terminal) used in AAA protocols in connection with authentication for network access. In established EAP and AAA protocols, the authentication request includes the Network Access Identifier of the user. In case of full authentication, EAP SIM and EAP AKA specify the identity format that the terminal shall use in order to request full authentication. According to the established specifications, the username portion of the NAI either includes the International Mobile Subscriber Identifier (IMSI) or a temporary identifier that is called a pseudonym in EAP SIM and EAP AKA specifications. The realm name used in the NAI is typically a common identifier of the home operator. Several AAA servers may have been employed to serve requests that are transmitted to this realm name. Thus, according to the prior art, in general, a realm name in the NAI can be shared by several AAA servers. For example: subscribers of MyOperator could use the realm name myoperator.com, and AAA messages would be routed to one of myoperator.com's AAA servers. That the realm indicates possibly a group of AAA servers is the case in EAP SIM and EAP AKA full authentication. However, according to the invention, each AAA server would also be allocated a unique realm name, such as for example, serverX.myoperator.com, and it is the unique realm names that would be used in reauthentication identities. Here, the third-level name serverX makes the realm name serverX.myoperator.com a unique realm name. The structured format of the realm name may allow some of the AAA elements to route all realms that end with myoperator.com to the correct next hop without regard to any third-level name that may have had to be added to make a realm name unique; for example, the attendant device 21a may not need to care about the full realm name and instead may use a simple rule: "Route *.myoperator.com to the MyOperator AAA proxy" (where the * character acts as a wildcard, i.e. it indicates any set of characters allowed in a name).

In a next step 12, a first one 23a of the AAA servers 23a 23b receives a request from an attendant device 21a (i.e. an AAA client, and in particular, e.g. a service access point) via a proxy AAA server 22 for (full) authentication in respect to a terminal 21 so that the attendant device 21a can grant the terminal 21 access to a network 24 (such as the Internet). Not shown (for clarity) in FIG. 2 are various of the elements of the one or more operator networks that make possible the wireless communication between the terminal 21 and the AAA servers 23a 23b (i.e. in particular the radio access networks for each operator network) as well as other elements that route communications to one or the other of the AAA servers 23a 23b.

In a next step 13, the first AAA server 23a transmits to the terminal 21 (via the proxy server 22 and attendant device 221a) a reauthentication identity (for use by the terminal in a later reauthentication), and includes the unique realm name in the reauthentication identity, which also includes a username portion. The reauthentication identity is different from the IMSI-based identity and the pseudonym identity that are used upon full authentication. Step 13 is performed as part of the full authentication procedure, which includes other steps that have been omitted from FIG. 1 for clarify. The username portion of the reauthentication identity is a one-time username chosen by the server. It could be a number or an identifier chosen at random. So a reauthentication identity could be for example:

1209834387@server15.myoperator.com.

In a next step 14, to perform a reauthentication (based typically on some condition having been met) the terminal 21 sends a request for reauthentication using the reauthentication identity including the unique realm name. In general, there are several ways in which reauthentication can be initiated. One way is that the attendant device 21a may initiate reauthentication. In this case on wireless LAN—where the "reauthentication request" that is forwarded based on the unique realm name contains an EAP identity response packet—the attendant device 21a sends the EAP identity request packet to the terminal 21, and the terminal responds with an EAP identity response that contains the reauthentication identity. This packet is then forwarded, over an AAA protocol, to the correct AAA server. Alternatively, the terminal 21 itself may initiate reauthentication. On wireless LAN, the terminal 21 sends an EAPOL-Start (EAP over LAN start) packet to the attendant device 21a. Upon receipt of EAPOL-Start, the attendant device 21a issues the EAP identity request packet to the terminal, and the reauthentication exchange proceeds as described below.

In a next step 15, any AAA network element (the attendant device 21a, the proxy 22, and the AAA servers 23a 23b) receiving the request examines the reauthentication identity included in the request to determine where to route the request (based on the reauthentication identity, which indicates the first AAA server 23a via the realm name). The routing is based e.g. on a routing table or other usual AAA routing means as appropriate. Typically, the proxy server 22 examines the realm name and directly routes the request to the first AAA server 23a. Thus the request is sooner or later received by the AAA server that performed the full authentication, i.e. by the first AAA server 23a.

In a next step 16, the first AAA server 23a responds to the request for reauthentication per an established protocol for reauthentication. In subsequent steps 17, subsequent communications from the terminal 21 to the first AAA server 23a are communicated per established AAA protocols between the terminal 21 and the first AAA server 23a via the attendant device 21a. The subsequent communications may be routed directly between the attendant device 21a and the first AAA server 23a or may be routed via intermediate AAA elements. The established AAA protocols typically include means for ensuring that the AAA server 23a performing authentication does not change during an authentication exchange.

In some instances, the terminal 21 may have communication via several different sessions simultaneously, using the full authentication procedure for each session. The sessions may be authenticated by the same AAA server or by different AAA servers, and may make use of the same or different radio technologies and the same or different applications for performing authentication. According to the invention, to accommodate such variability, the terminal 21 maintains separate state information for each such session, and the terminal 21 may then perform reauthentication separately for each such session, as described in connection with FIG. 1. Correspondingly, each AAA server 23a 23b used in authentication for one or more concurrent sessions maintains separate state information for each such session.

Note that although the invention is related to wireless LAN authentication, it is also relevant to xDSL, dial-up, Ethernet, and other authentication contexts. The Extensible Authentication Protocol methods for UMTS and GSM authentication are targeted at mobile operators who wish to administer WLANs or other complementary access networks; it is possible that the invention will never be used on actual UMTS or GSM networks.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
   receiving a request for full authentication of a terminal;
   transmitting to the terminal a reauthentication identity including a unique realm name uniquely identifying an authentication server in response to the request for full authentication; and
   receiving a request for reauthentication from the terminal, the request for reauthentication including the reauthentication identity including the unique realm name uniquely identifying the authentication server;
   wherein the request for reauthentication is routed to the authentication server according to the unique realm name included in the request for reauthentication.

2. An apparatus, comprising:
   means for receiving a request for full authentication of a terminal;
   means for transmitting to the terminal a reauthentication identity including a unique realm name uniquely identifying an authentication server in response to the request for full authentication; and
   means for receiving a request for reauthentication from the terminal, the request for reauthentication including the reauthentication identity including the unique realm name uniquely identifying the authentication server;
   wherein the request for reauthentication is routed to the authentication server according to the unique realm name included in the request for reauthentication.

3. A computer program product comprising: a computer readable storage structure embodying computer program code thereon for execution by a computer processor in an authentication network element, wherein said computer program code includes instructions for performing a method according to claim 1.

4. A system, comprising:
   a first authentication server configured to receive a request for full authentication of a terminal, and configured to transmit to the terminal a reauthentication identity including a unique realm name uniquely identifying the first authentication server in response to the request for full authentication; and
   a second authentication server configured to receive a request for reauthentication from the terminal, the request for reauthentication including the reauthentication identity including the unique realm name identifying the first authentication server, and configured to route the request for reauthentication to the first authentication server according to the unique realm name identifying the first authentication server.

5. An apparatus, comprising:
   means for transmitting a request for full authentication to a first authentication server;
   means for receiving from the first authentication server a reauthentication identity including a unique realm name uniquely indicating the first authentication server in response to the request for full authentication; and
   means for transmitting to a second authentication server a request for reauthentication using the reauthentication identity including the unique realm name.

6. The apparatus as in claim 5, wherein the means for transmitting to the second authentication server includes the reauthentication identity in an identity response packet according to an Extensible Authentication Protocol.

7. An apparatus, comprising a processor configured to:
   receive a request for full authentication of a terminal;
   transmit to the terminal a reauthentication identity including a unique realm name uniquely identifying an authentication server in response to the request for full authentication; and
   receive a request for reauthentication from the terminal, the request for reauthentication including the reauthentication identity including the unique realm name uniquely identifying the authentication server;
   wherein the request for reauthentication is routed according to the authentication server according to the unique realm name included in the request for reauthentication.

8. An apparatus, comprising a processor configured to:
   transmit a request for full authentication to a first authentication server;
   receive from the first authentication server a reauthentication identity including a unique realm name uniquely indicating the first authentication server in response to the request for full authentication; and
   transmit to a second authentication server a request for reauthentication using the reauthentication identity including the unique realm name.

9. The apparatus as in claim 8, wherein the processor is configured to include the reauthentication identity in an identity response packet according to an Extensible Authentication Protocol.

10. The apparatus as in claim 2, wherein the apparatus comprises an authentication server.

11. The apparatus as in claim 2, wherein the apparatus comprises a proxy server.

12. The apparatus as in claim 2, wherein the apparatus comprises a service access point for authentication by the authentication server.

13. A method, comprising:
    transmitting a request for full authentication to a first authentication server;
    receiving from the first authentication server a reauthentication identity identity including a unique realm name uniquely indicating the first authentication server in response to the request for full authentication; and
    transmitting to a second authentication server a request for reauthentication using the reauthentication identity including the unique realm name.

14. A method as in claim 13, wherein the reauthentication identity is included in an identity response packet according to an Extensible Authentication Protocol.

15. A computer program product comprising: a computer readable storage structure embodying computer program code thereon for execution by a computer processor in a terminal, wherein said computer program code includes instructions for performing a method according to claim 13.

* * * * *